(12) United States Patent
Ionescu et al.

(10) Patent No.: US 9,213,565 B2
(45) Date of Patent: Dec. 15, 2015

(54) METHODS AND SYSTEMS FOR MINING DATACENTER TELEMETRY DATA

(71) Applicant: VMware, Inc., Palo Alto, CA (US)

(72) Inventors: Dragos Ionescu, Cambridge, MA (US); Rean Griffith, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 224 days.

(21) Appl. No.: 13/931,350

(22) Filed: Jun. 28, 2013

(65) Prior Publication Data

US 2015/0007173 A1    Jan. 1, 2015

(51) Int. Cl.
*G06F 9/455*    (2006.01)

(52) U.S. Cl.
CPC ........ *G06F 9/45533* (2013.01); *G06F 9/45558* (2013.01)

(58) Field of Classification Search
CPC .................................................. G06F 9/45558
See application file for complete search history.

(56) References Cited

U.S. PATENT DOCUMENTS

2006/0224725 A1* 10/2006 Bali et al. ................. 709/224
2010/0281482 A1* 11/2010 Pike et al. ................. 718/102

OTHER PUBLICATIONS

Bodik, Peter, et al., "Fingerprinting the Datacenter: Automated Classification of Performance Crises", In Proceedings of the 5th European Conference on Computer Systems, NY, NY 2010.

* cited by examiner

*Primary Examiner* — Camquy Truong

(57) ABSTRACT

This disclosure is directed to systems and methods for mining streams of telemetry data in order to identify virtual machines ("VMs"), discover relationships between groups of VMs, and evaluate VM performance problems. The systems and methods transform streams of raw telemetry data consisting of resource usage and VM-related metrics into information that may be used to identify each VM, determine which VMs are similar based on their telemetry data patterns, and determine which VMs are similar based on their patterns of resource consumption. The similarity patterns can be used to group VMs that run the same applications and diagnose and debug VM performance.

24 Claims, 16 Drawing Sheets

$$M(t_1) = \begin{bmatrix} \overline{VM}(t_1)_0 \\ \overline{VM}(t_1)_1 \\ \overline{VM}(t_1)_2 \\ \vdots \\ \overline{VM}(t_1)_N \end{bmatrix} = \begin{bmatrix} m(t_1)_{00} & m(t_1)_{01} & m(t_1)_{02} & & m(t_1)_{0d} \\ m(t_1)_{10} & m(t_1)_{11} & m(t_1)_{12} & \cdots & m(t_1)_{1d} \\ m(t_1)_{20} & m(t_1)_{21} & m(t_1)_{22} & & m(t_1)_{2d} \\ & \vdots & & \ddots & \\ m(t_1)_{N0} & m(t_1)_{N1} & m(t_1)_{N2} & & m(t_1)_{Nd} \end{bmatrix} \overset{402}{\leftarrow}$$

$$M(t_2) = \begin{bmatrix} \overline{VM}(t_2)_0 \\ \overline{VM}(t_2)_1 \\ \overline{VM}(t_2)_2 \\ \vdots \\ \overline{VM}(t_2)_N \end{bmatrix} = \begin{bmatrix} m(t_2)_{00} & m(t_2)_{01} & m(t_2)_{02} & & m(t_2)_{0d} \\ m(t_2)_{10} & m(t_2)_{11} & m(t_2)_{12} & \cdots & m(t_2)_{1d} \\ m(t_2)_{20} & m(t_2)_{21} & m(t_2)_{22} & & m(t_2)_{2d} \\ & \vdots & & \ddots & \\ m(t_2)_{N0} & m(t_2)_{N1} & m(t_2)_{N2} & & m(t_2)_{Nd} \end{bmatrix} \overset{404}{\leftarrow}$$

$$\vdots \overset{406}{\leftarrow}$$

$$M(t_n) = \begin{bmatrix} \overline{VM}(t_n)_0 \\ \overline{VM}(t_n)_1 \\ \overline{VM}(t_n)_2 \\ \vdots \\ \overline{VM}(t_n)_N \end{bmatrix} = \begin{bmatrix} m(t_n)_{00} & m(t_n)_{01} & m(t_n)_{02} & & m(t_n)_{0d} \\ m(t_n)_{10} & m(t_n)_{11} & m(t_n)_{12} & \cdots & m(t_n)_{1d} \\ m(t_n)_{20} & m(t_n)_{21} & m(t_n)_{22} & & m(t_n)_{2d} \\ & \vdots & & \ddots & \\ m(t_n)_{N0} & m(t_n)_{N1} & m(t_n)_{N2} & & m(t_n)_{Nd} \end{bmatrix} \overset{408}{\leftarrow}$$

FIG. 4

METHODS AND SYSTEMS FOR MINING DATACENTER TELEMETRY DATA

TECHNICAL FIELD

This disclosure is directed to computational systems and methods for analyzing performance of virtual machines.

BACKGROUND

In recent years, virtual machines ("VMs") have become increasingly used in datacenter operations and in other large-scale computing environments. VMs are a software implemented abstraction of a physical machine, such as a computer, which is presented to the application layer of the system. A VM may be based on a specification of a hypothetical computer and may be designed to recreate a computer architecture and function of a physical computer. In datacenters, VMs are often used in server consolidation. For example, a typical non-virtualized application server may achieve between 5% to 10% utilization. But a virtualized application server that hosts multiple VMs can achieve between 50% to 80% utilization. As a result, virtual clusters composed of multiple VMs can be hosted on fewer servers, translating into lower costs for hardware acquisition, maintenance, energy consumption and cooling system usage. The VMs in a virtual cluster may be interconnected logically by a virtual network across several physical networks.

In order to monitor the performance of VMs, datacenters generate streams of telemetry data. Each stream is composed of metrics that represent different aspects of the behavior of an application, a VM, or a physical machine. For example, virtual machine monitors can be used to produce a stream of telemetry data composed of hundreds of real and synthesized metrics associated with a VM. The telemetry streams may be sampled at very high rates. As a result, the telemetry datasets can be very large, containing hundreds of metrics for each VM resulting in aggregate data volumes that scale with the number of VMs monitored. The telemetry data size and high sample rates strain efforts to store, process, and analyze the telemetry data stream.

SUMMARY

This disclosure is directed to systems and methods for mining streams of telemetry data in order to identify virtual machines ("VMs"), discover relationships between groups of VMs, and evaluate VM performance problems. The systems and methods transform streams of raw telemetry data consisting of resource usage and VM-related metrics into information that may be used to identify each VM, determine which VMs are similar based on their telemetry data patterns, and determine which VMs are similar based on their patterns of resource consumption. The similarity patterns can be used to group VMs that run the same applications and diagnose and debug VM performance.

DESCRIPTION OF THE DRAWINGS

FIG. 4 shows data matrices for each of the n epochs described above with reference to FIG. 3.

DETAILED DESCRIPTION

Figure 1:
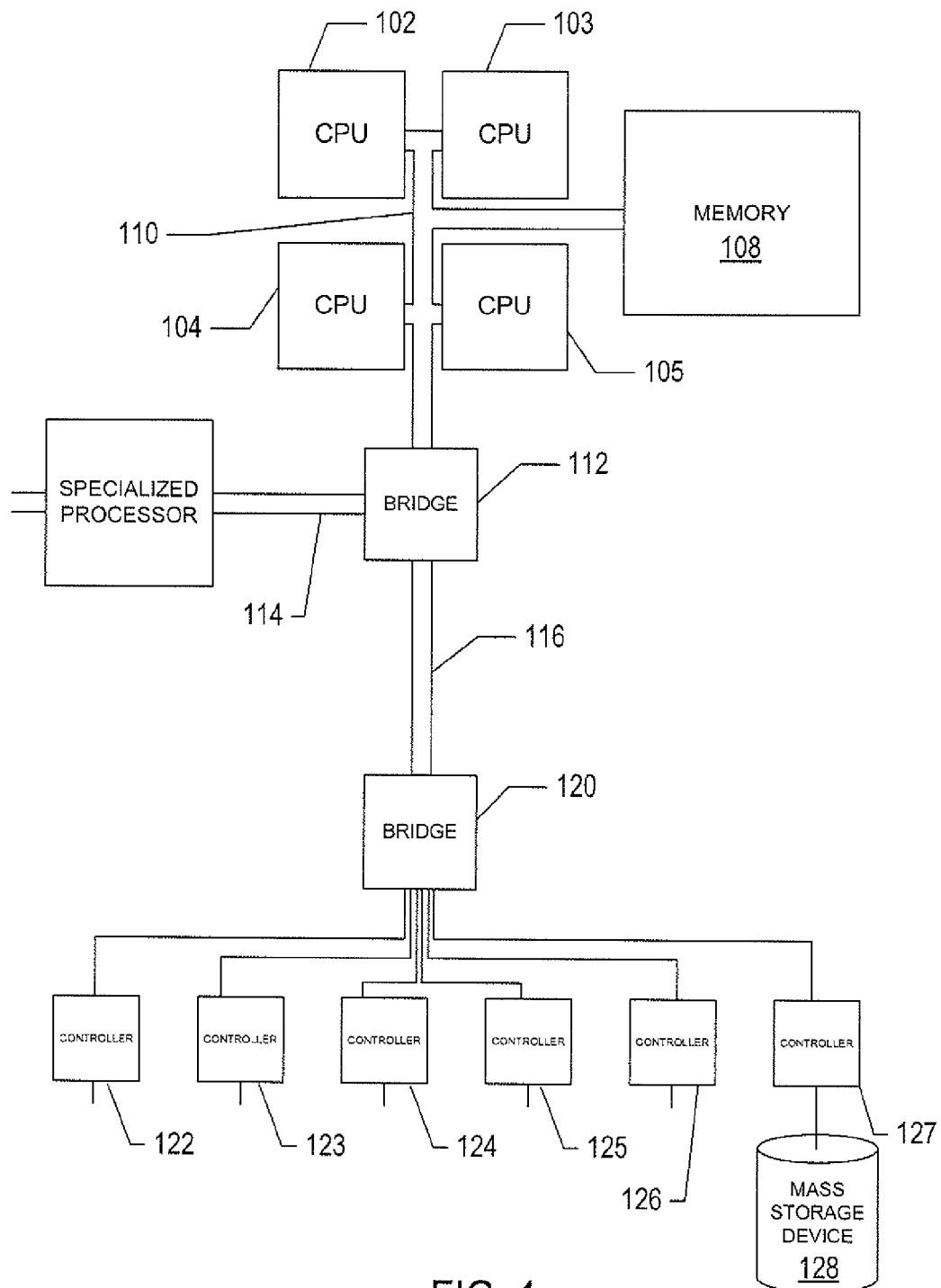
FIG. 1 shows an example of a generalized data-processing system.

Systems and methods described below model virtual machine ("VM") metrics in order to obtain VM performance related information. In particular, the systems and methods receive streams of raw telemetry data associated with each VM and determine VM similarity. In other words, the system and methods automatically identify patterns associated with groups of VMs and application workloads. A fingerprint is constructed for each VM. The fingerprint identifies the VM and characterizes the VM's performance. A fingerprint may also be used to identify performance problems of a VM, compare the performance of the VM to the performance of other VMs in order to obtain information about compatible co-location and compare clusters of VMs run by different hosts in order to identify factors that degrade performance.

The power of similarity relationships stems from the additional context that similarity provides. For example, VMs that should ostensibly be "similar" because the VMs run the same applications (version, configuration etc.) or perform the same task but appear in practice to be dissimilar can be used to signal a possible performance issue. The quantitative or qualitative "distance" between a VM and its expected cohort may be used to explain or diagnose the discrepancy. Analogously, the distance between a VM and another cohort can be used to explain why the VMs are dissimilar. Moreover, groups of similar VMs may help redefine the notion of normal and abnormal VM performance.

Fingerprints are constructed to determine the relationships between VMs. These relationships (neighborhoods of similarity) between VMs based on their telemetry may then be used to explain performance variations, such as explaining why certain VMs that should ostensibly be similar behave as if they are not. The fingerprints scale with the number of metrics considered not the number of machines, which is important for use in large clusters.

The methods described below uses VM similarity rather than historical observations in order to provide additional context for anomaly detection and diagnosis. The use of similarity also allows users to attempt diagnosis before an extensive history has been collected by comparing a VM with its nearest neighbors. The methods described below use clustering techniques from statistical machine learning to automatically detect instances of similar VMs (i.e., a neighborhood) and then examine the behavior of key telemetry metrics of all the VMs in that neighborhood to detect, explain, and diagnose differences between the metrics.

It should be noted at the onset that streams of telemetry data and data output from the systems and methods for analyzing the streams of telemetry data described below are not, in any sense, abstract or intangible. Instead, the data is necessarily digitally encoded and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems on electronically or magnetically stored data, with the results of the data processing and data analysis digitally encoded and stored in one or more tangible, physical, data-storage devices and media.

FIG. 1 shows an example of a generalized computer system that executes efficient methods for mining datacenter telemetry data and therefore represents a data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. The busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of computer-readable media, such as computer-readable medium 128, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 128 is a data-storage device, including electronic memory, optical or magnetic disk drive, USB drive, flash memory and other such data-storage device. The computer-readable medium 128 can be used to store machine-readable instructions that encode the computational methods described below and can be used to store encoded data, during store operations, and from which encoded data can be retrieved, during read operations, by computer systems, data-storage systems, and peripheral devices.

A stream of raw telemetry data is collected for each VM. The telemetry data may be generated by a virtual machine monitor ("VMM"), which may be an application, firmware or hardware that runs VMs and generates metrics in the form of a stream of telemetry data associated with each VM. A performance manager manages statistics collected for each of the VMs and provides an application programming interface ("API") for querying performance counters. A performance counter is the value of a metric at a particular point in time. The telemetry data stream associated with each VM is composed of performance counter values collected for each metric in intervals of time called epochs. In other words, each metric is sampled a number of times within an epoch. An order statistic is used to identify features of each VM. For example, the data collected for each VM is stored in a computer-readable medium and can be represented in the following format:

$VM_L$
metric i name
value 1, value 2, ..., value M
where
  subscript L is a VM integer index that ranges from 0 to N;
  index i identifies the metric that ranges from 0 to d+1; and
  M is the number of performance counter values sampled in an epoch.

The order statistic applied to performance counter values associated with the metric i is called a feature and calculated over each epoch. The feature can be a percentile, minimum, maximum, sample average or sample median. In the following description, the feature is the median of the metric values sampled over an epoch. Performance counters may be sampled at different frequencies, such as every 20 seconds, one minute, or five minutes, and the epoch is longer than the interval between samples. Every epoch is sampled for the previous performance counter values that occur within the epoch. For example, consider a raw telemetry data stream composed of 300 metrics for a VM. Assuming every epoch is 1 hour in duration and the performance manager samples the 300 metrics every 20 seconds. As a result, a 300 metric by 180 sample value matrix (i.e., 54,000 sample values) is generated for each epoch.

Figure 2:
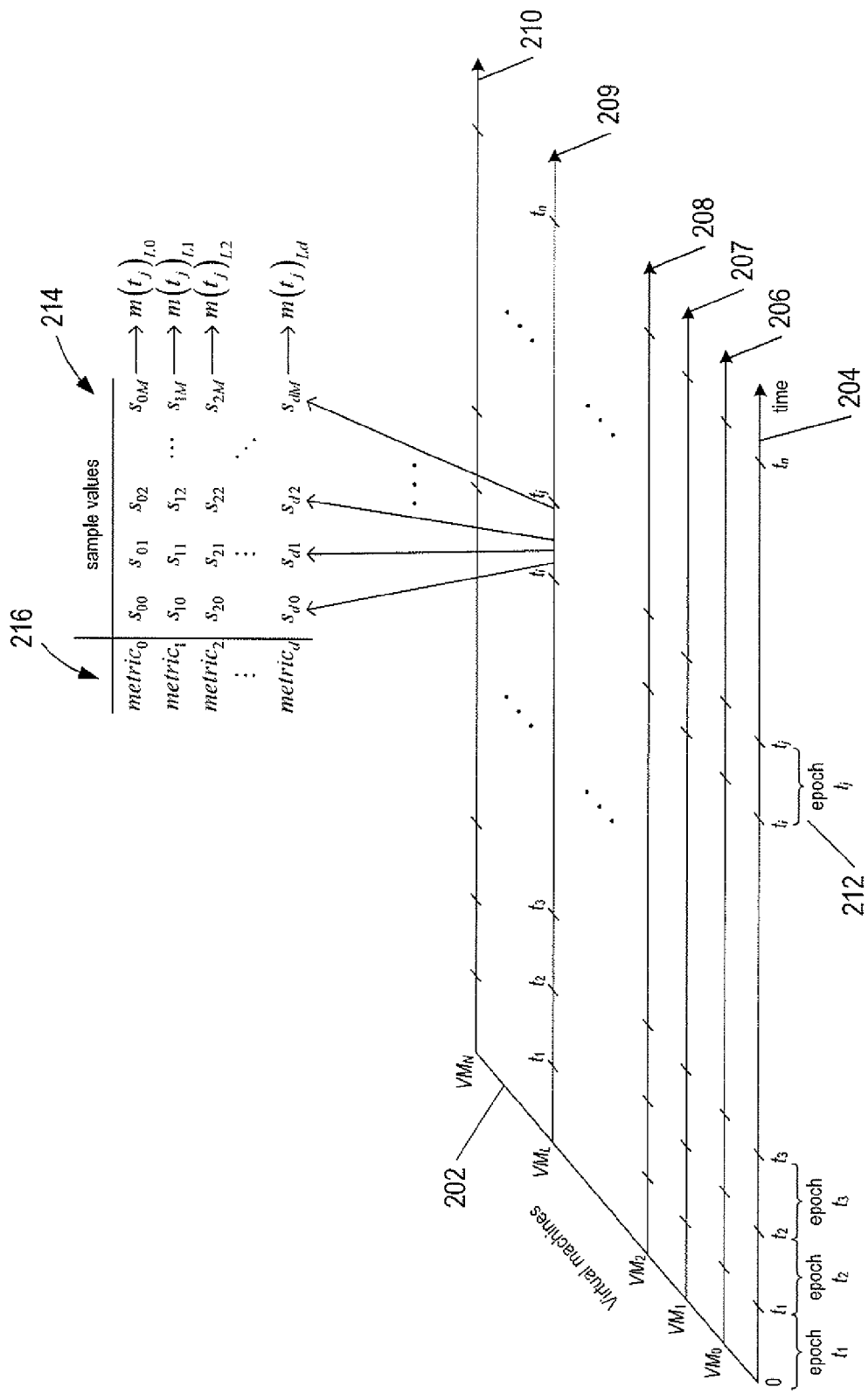
FIG. 2 shows streams of telemetry data associated with virtual machines ("VMs").

FIG. 2 shows streams of telemetry data associated with N+1 VMs that are monitored and controlled by one or more VMMs. In FIG. 2, axis 202 represents a virtual machine axis with the N+1 VMs identified along the axis as $VM_0$, $VM_1$, ..., $VM_N$ and axis 204 represents continuous time. Directional arrows 206-210 represent streams of raw telemetry data associated with each of the VMs $VM_0$, $VM_1$, ..., $VM_N$. Regularly spaces times $t_1, t_2, t_3, \ldots, t_n$ are identified along continuous time axis 204 and each interval of time between two consecutive times is an epoch identified by the latest of the two consecutive times. For example, time interval 212 between consecutive times $t_i$ and $t_j$ is identified as epoch $t_j$. The data stream associated with each VM is composed of performance counter values sampled a number of times within each epoch. FIG. 2 includes a sample data matrix 214 that represents sampled performance counter values for d+1 metrics associated with VM $VM_L$ in the epoch $t_j$. The metrics are denoted by $metric_0, \ldots, metric_d$ and are listed in column 216. The sample values in the matrix 214 are denoted by $s_{pq}$, where p is the metric index that ranges from 0 to d, and q is the sample index that ranges from 0 to M.

Next, for each epoch, the metrics are pre-processed to discard constant-valued metrics and system metrics across the VMs. As a result, substantially constant metrics are discarded from the sample data matrices. The union of non-constant metrics are considered for further analysis below. Note that a metric that is constant for one VM but variable for another VM is not discarded, because the sample data matrices of each VM are separately pre-processed for each epoch.

For each metric, the median of the associated sample values collected in an epoch is calculated as follows:

$$m(t_j)_{Lp} = \text{median}\{s_{p0}, s_{p1}, \ldots, s_{pM}\} \qquad (1)$$

where $m(t_j)_{Lp}$ is the median value of the M+1 sample values $s_{p0}, s_{p1}, \ldots, s_{pM}$ of the metric$_p$ collected in the epoch $t_j$ for the VM VM$_L$. At each epoch, the median of each metric is calculated for each VM.

Figure 3A:
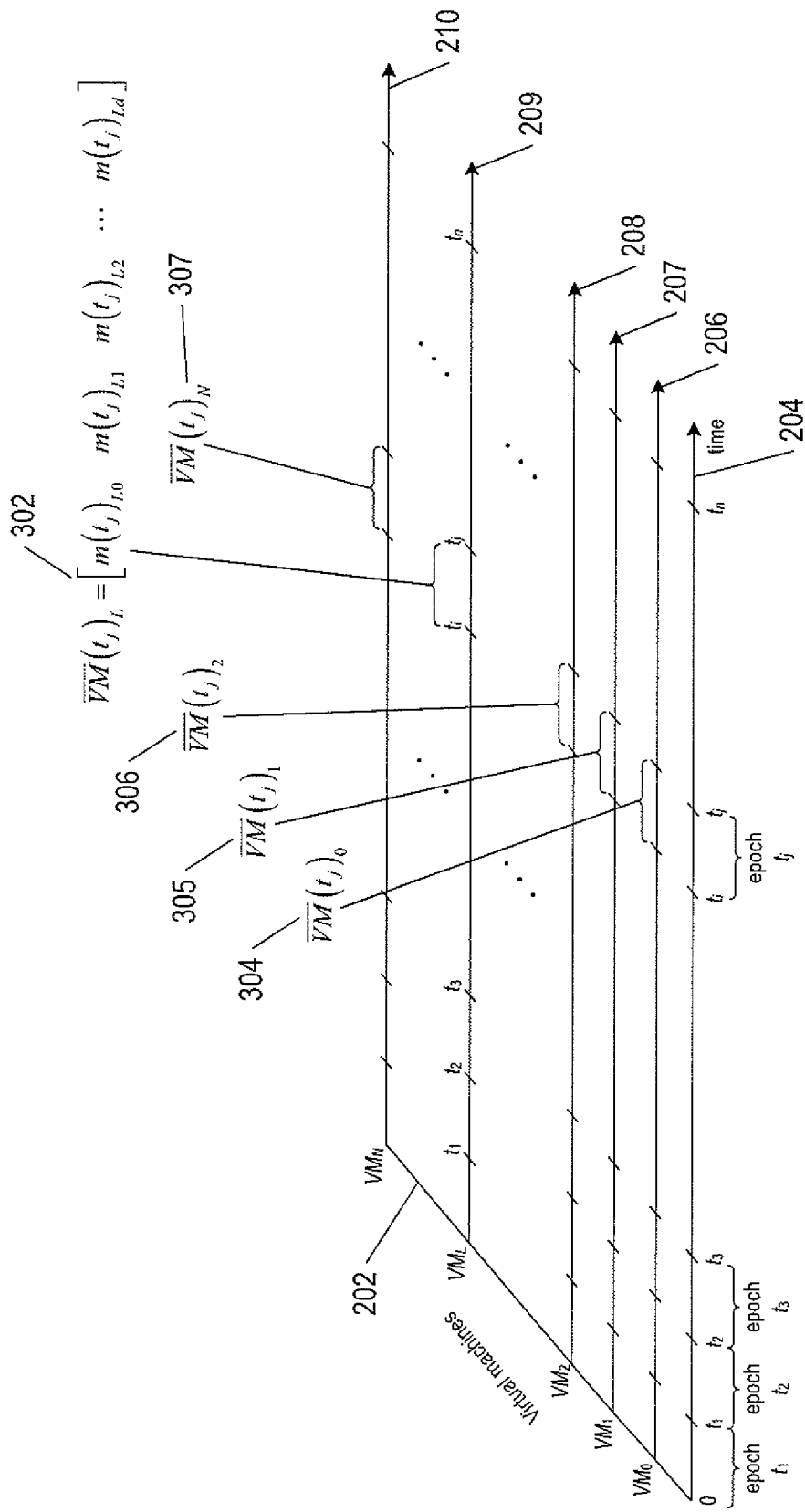
FIG. 3A shows an example of order statistics for an epoch in a streams of telemetry data shown in FIG. 2.

The d+1 order statics obtained for each epoch and each VM are arranged into vectors that are, in turn, arranged into data matrices associated with each epoch. FIG. 3A shows an example of order statistic associated with an epoch in the streams of telemetry data shown in FIG. 2 arranged into metric data vectors. In the example of FIG. 3A, the d+1 median values $m(t_j)_{L0}, \ldots, m(t_j)_{Ld}$ of the corresponding metrics metric$_0, \ldots,$ metric$_d$ associated with the VM VM$_L$ in the epoch $t_j$ are called features and arranged into a row feature vector 402 denoted by:

$$\overrightarrow{VM}(t_j)_L = [m(t_j)_{L0} m(t_j)_{L1} \ldots m(t_j)_{Ld}] \quad (2)$$

Figure 3B:
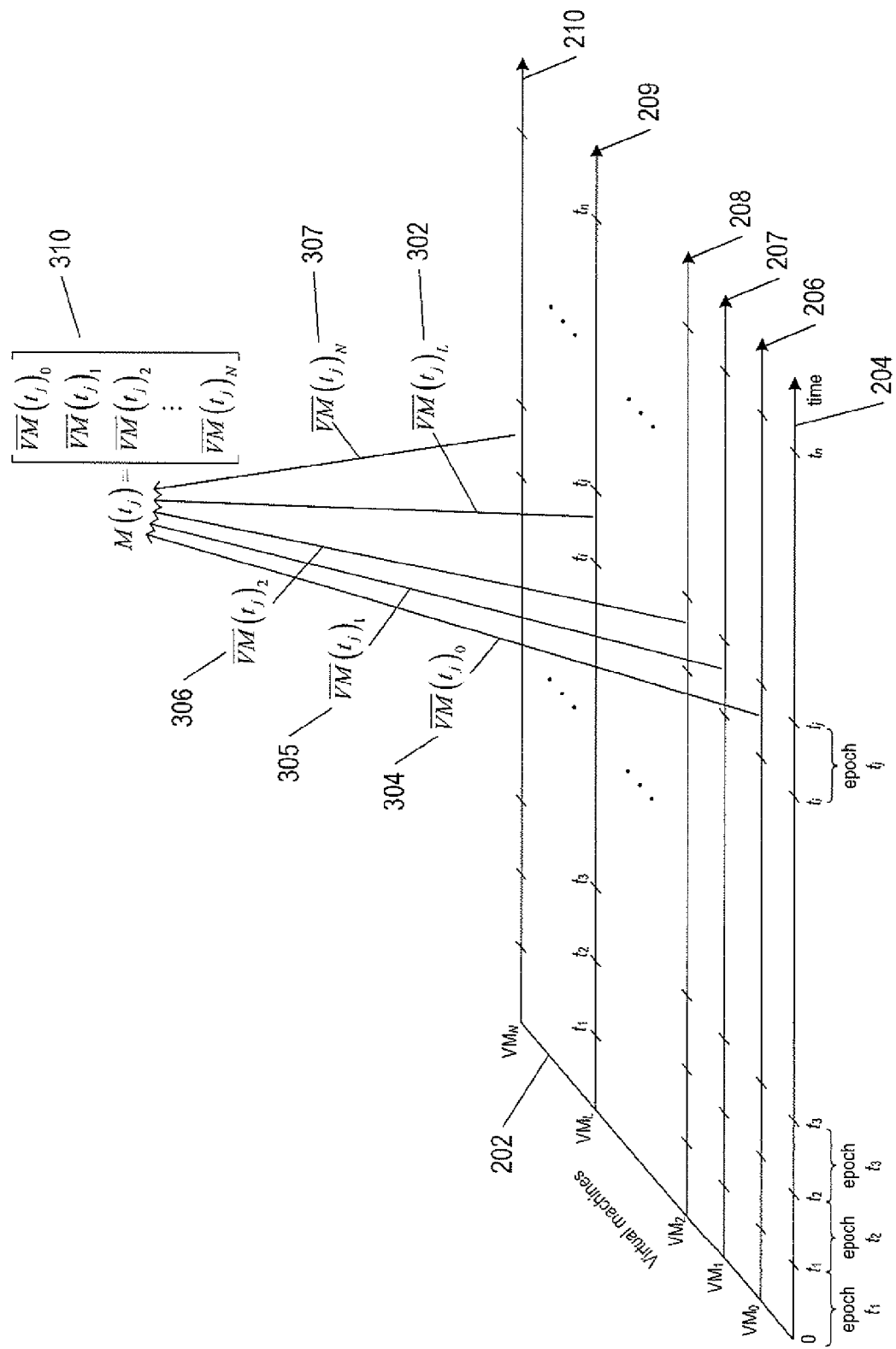
FIG. 3B shows an example of feature vectors associated with an epoch.

For the epoch $t_j$, feature vectors $\overrightarrow{VM}(t_j)_0$ 304, $\overrightarrow{VM}(t_j)_1$ 305, $\overrightarrow{VM}(t_j)_2$ 306, ..., $\overrightarrow{VM}(t_j)_N$ 307 are formed for each of the VMs VM$_0, \ldots,$ VM$_N$, respectively, according to Equation (2). Next, for each epoch $t_j$, the associated feature vectors are arranged as rows in data matrices denoted by M($t_j$). FIG. 3B shows an example of feature vectors associated with an epoch arranged into a data matrix. In the example of FIG. 3B, feature vectors $\overrightarrow{VM}(t_j)_0$ 304, $\overrightarrow{VM}(t_j)_1$ 305, $\overrightarrow{VM}(t_j)_2$ 306, ..., $\overrightarrow{VM}(t_j)_L$ 302, ..., VM($t_j$)$_N$ 307 are arranged into rows of data matrix M($t_j$) 310 that corresponds to the epoch $t_j$. A data matrix is generated for each of the epochs $t_1, t_2, \ldots, t_n$.

FIG. 4 shows three of n data matrices for each of the n epochs described above with reference to FIG. 3. Each row in the data matrix 402 is composed of d+1 features for the d+1 metrics collected for the VMs VM$_0, \ldots,$ VM$_N$ over the first epoch $t_1$. Each row in the data matrix 404 is composed of d+1 features for the d+1 metrics collected for the VMs VM$_0, \ldots,$ VM$_N$ over the first epoch $t_2$. Dots 406 represent the data matrices for the epochs $t_2$ through $t_{n-1}$. Finally, each row in the data matrix 408 is composed of d+1 features for the d+1 metrics collected for the VMs VM$_0, \ldots,$ VM$_N$ over the first epoch $t_n$. A data matrix is stored for each epoch. The n data matrices are called "raw metric data."

Next, data matrices may be compacted to eliminate data redundancies and to obtain a compact metric data representation. One computational technique for compacting the data matrices is principle component analysis ("PCA"). PCA has the effect of reducing the dimensions of feature vectors $\overrightarrow{VM}(t_j)_L$ to a lower dimensional projection of the original feature vector. For example, feature vectors described above are (d+1)-dimensional. PCA may be used to reduce a (d+1)-dimensional feature vector to a two- or three-dimensional feature vector. By reducing to a two- or three-dimensional data set, clusters of VMs can be represented graphically, enabling visual inspection of the results. PCA is a data summarization technique used to characterize the variance of a set of data, can be used to identify principle vector components, and eliminate components that are redundant. PCA is applied to each of the feature vectors of the data matrices M($t_j$). For the matrix M($t_j$), the mean is calculated for each of the d+1 features as follows:

$$m_p = \frac{1}{N+1} \sum_{L=0}^{N+1} m(t_j)_{Lp} \quad (3)$$

where p is the metric index that ranges from 0 to d+1. The mean for each feature is subtracted from each of the d+1 data dimensions in the feature vectors to obtain mean-centered feature vectors:

$$\widetilde{\overrightarrow{VM}}_L = [\tilde{m}(t_j)_{L0} \tilde{m}(t_j)_{L1} \ldots \tilde{m}(t_j)_{Ld}] \quad (4)$$

where each element in the mean centered feature vector is given by:

$$\tilde{m}(t_j)_{Lp} = m(t_j)_{Lp} - m_p$$

The mean-centered feature vectors can be arranged in rows to give a mean centered data matrix give by:

$$\tilde{M}(t_j) = \begin{bmatrix} \tilde{m}(t_j)_{00} & \cdots & \tilde{m}(t_j)_{Ld} \\ \vdots & \ddots & \vdots \\ \tilde{m}(t_j)_{N0} & \cdots & \tilde{m}(t_j)_{Nd} \end{bmatrix} \quad (5)$$

The covariance matrix is calculated for each of the mean centered feature vectors $\widetilde{\overrightarrow{VM}}_L$ as follows to give a (d+1)×(d+1) matrix:

$$\Sigma = \widetilde{\overrightarrow{VM}}_L \cdot \widetilde{\overrightarrow{VM}}_L^T \quad (6)$$

where T represents matrix transpose.

Eigenvalues and eigenvectors of the covariance matrix $\Sigma$ are calculated. The dimension u (i.e., u<d+1) to which a user selects to reduce the data is selected, which may be accomplished by first ordering the eigenvalues from highest to lowest then forming a matrix of eigenvectors F(d+1×u) composed of u eigenvectors associated with the u highest eigenvalues. The PCA data matrix is constructed by multiplying the matrix $\tilde{M}(t_j)$ by the matrix F.

$$M_{PCA}(t_j) = \tilde{M}(t_j) \cdot F \quad (7)$$

In the resulting PCA data matrix $M_{PCA}(t_j)$, the rows are reduced feature vectors that correspond to the feature vectors in the data matrix $\tilde{M}(t_j)$.

K-means clustering is then used to identify and group together the VMs that are similar based on their corresponding metric values. K-means clustering is an unsupervised machine learning technique used to identify structure in a data set. K-means clustering can be applied to raw data in the data matrices $\tilde{M}(t_j)$ or applied to the PCA data matrix $M_{PCA}(t_j)$. K-means clustering treats the feature vectors $\overrightarrow{VM}_L$ as though the feature vectors lie within a d-dimensional space. As a result, each feature vector $\overrightarrow{VM}_L$ corresponds to a VM and is assumed to be a point in a (d+1)-dimensional space based on the vector's metric values. The feature vectors that are close in space correspond to VMs that have similar metric values. K-means clustering receives a (d+1)-dimensional feature vector VM$_L$ and a set of clusters C={$C_1, C_2, \ldots, C_S$} amoung which the features vectors are to be partitioned. K-means clustering minimizes within-cluster sum of squares given by:

$$\underset{C}{\operatorname{argmin}} \sum_{i=1}^{s} \sum_{\vec{VM}_L \in C_i} \|\vec{VM}_L - \vec{Z}_i\|^2 \qquad (8)$$

where $\vec{Z}_1$ is the centroid of $C_i$.

Given randomly generated initial values $Z_1^0, Z_2^0, \ldots, Z_S^0$ for the cluster centroids, K-means clustering iteratively proceed through assignment and update steps until convergence. At each step, each feature vector $\vec{VM}_L$ is assigned to a cluster $C_j^t$ with the closest centroid $\vec{Z}_j^t$, and the centroid of each cluster is updated according to $$Z_j^{t+1} = \frac{1}{|C_j^t|} \sum_{\vec{VM}_L \in C_j^t} \vec{VM}_L \qquad (9)$$

The K-means method requires number of clusters s to be provided as an input, which implies that an optimal number of clusters for a given data configuration has to be determined. A poor choice for the number of clusters can lead to a poor result. Two different methods may be used to select the optimal number of clusters: the elbow method and Bayesian information criterion ("BIC"). For the elbow method, a marginal loss distortion $D_s$ for a given partition of data s clusters is defined as $$D_s = \frac{1}{m} \sum_{i=1}^{s} \sum_{\vec{VM}_L \in C_i} \|\vec{VM}_L - \vec{Z}_i\|^2 \qquad (10)$$

Figure 5A:
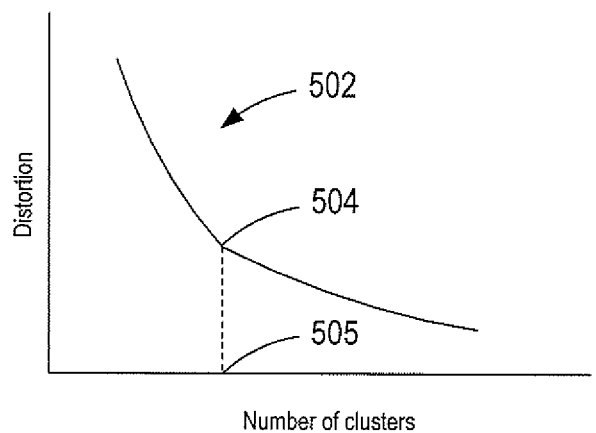
FIGS. 5A-5B show plots of marginal loss distortion versus number of clusters.
Figure 5B:
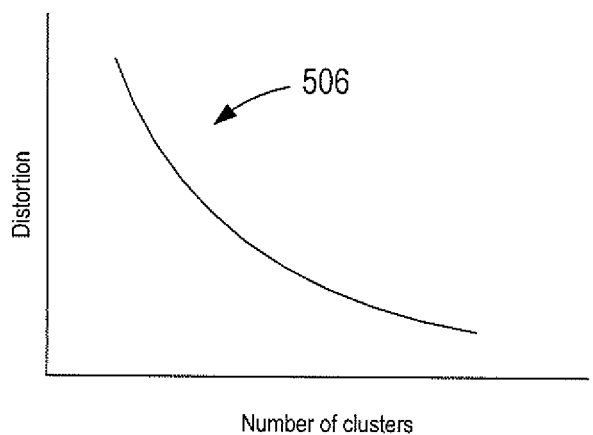

The elbow criterion run K-means for s=1, 2, 3, ... and in each case computes the associated distortion given in Equation (10). Note that as the number of clusters increases, the distortion decreases to the value "0" as s approaches in. Additional clusters do not produce a better cluster model for the data. As a result, a best model may correspond to a sudden drop or "elbow" in the marginal loss distribution. FIGS. 5A-5B show plots of marginal loss distortion versus number of clusters. In FIG. 5A, marginal distortion curve 502 has a drop or elbow 504 that corresponds to an optimum number of clusters 504. In FIG. 5B, marginal distortion curve 506 does not have a discernible elbow. As a result, the elbow method based on marginal loss cannot be used to determine an optimum number of clusters for the example in FIG. 5B.

Alternatively, BIC provides a quantitative method for choosing the number of clusters. If $L(\theta)$ is the log-likelihood function and m is the number of clusters, then the BIC is given by:

$$BIC_m = L(\theta) - \frac{f}{2} \ln n \qquad (11)$$

where
 f is the number of free parameters, and
 n is the number of observation.
If s is the number of clusters and (d+1) is the number of dimensions, then the number of free parameters is the sum of s−1 class probabilities, s(d+1) centroids and sd(d+1)/2 free parameters in the co-variance matrix. The log-likelihood function of the ith cluster and the BIC are given by:

$$L(\theta_i) = n_i \log(n_i) - n_i \log(n) - \frac{n_i}{2} \log(2\pi) - \frac{dn_i}{2} \log \Sigma_i - \frac{n_i - m}{2} \qquad (12)$$

and $$BIC_m \sum_{i=1}^{m} \left[ \begin{array}{c} n_i \log(n_i) - n_i \log(n) - \\ \frac{n_i}{2} \log(2\pi) - \frac{dn_i}{2} \log \Sigma_i - \frac{n_i - m}{2} \end{array} \right] - \frac{f}{2} \cdot \ln n$$

where $$\Sigma_i = \frac{1}{n_i - m} \sum_{\vec{VM}_L \in C_i} \|\vec{VM}_L - \vec{Z}_i\|^2$$

Figure 6A:
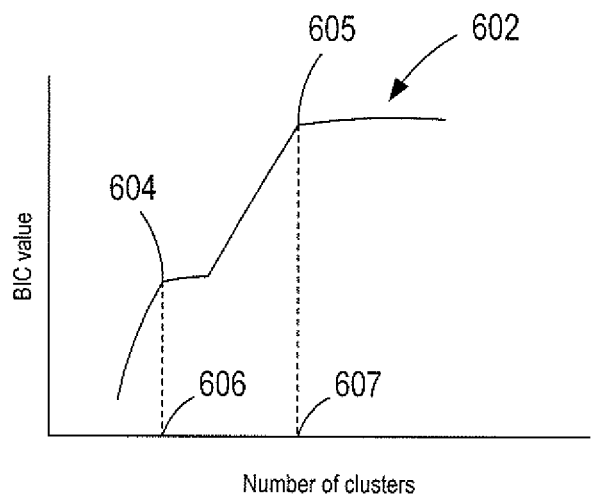
FIGS. 6A-6B show plots of Bayesian information criteria versus number of clusters.
Figure 6B:
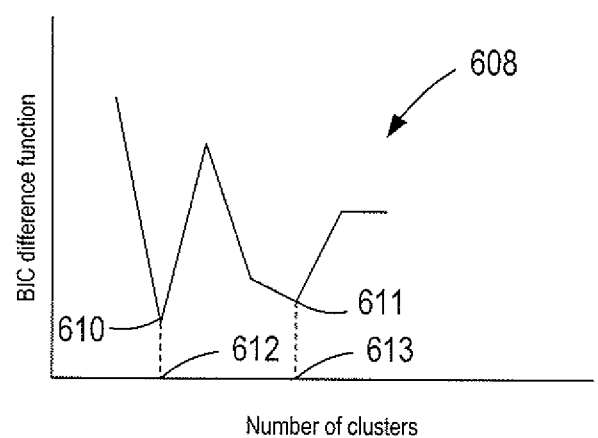

FIGS. 6A-6B show cluster BIC plots. In FIG. 6A, BIC values versus number of clusters are represented by curve 602. Bends 604 and 605 can be used to select the number of corresponding clusters 606 and 607. In FIG. 6B, curve 608 represents a BIC difference function $F(m)=BIC_{m-1} + BIC_{m+1} - 2BIC_m$ versus number of clusters. Troughs 610 and 611 can be used to select the number of clusters 612 and 613, which correspond to the bends 604 and 605 in FIG. 6A.

However, it is not yet determined whether to select the number of clusters that correspond to troughs 610 and 611. An angle based method can be used to select the optimal number of clusters. First, the local minimas among the successive differences are found and sorted in the decreasing order of their absolute values. Pointers to the corresponding number of clusters are maintained. The angle associated with each local minimum is computed as follows. When i is the corresponding number of clusters, the angle can be computed according to $$\text{Angle} = \arctan\left(\frac{1}{F(i) - F(i-1)}\right) + \arctan\left(\frac{1}{F(i+1) - F(i)}\right) \qquad (13)$$

When the first local maxima is found among the angles, the method stops.

Using PCA described above, the original N+1 (d+1)-dimensional feature vectors $\vec{VM}_L$ are projected them into u-dimensional vectors. For example, the (d+1)-dimensional feature vectors $\vec{VM}_L$ may be projected into 2-dimensional vectors that lie in the Euclidean plane. Furthermore, K-means clustering has been used to group the u-dimensional vectors into clusters. The VMs in the same cluster are similar, but which of the original d+1 metrics responsible for bringing the VMs together in the same cluster remains to be determined. One-vs-all logistic regression is used to determine which metrics best characterize the cluster. BIC works by providing a separator between a cluster of interest and the remaining clusters (e.g., in two dimensions the separator is a line and in three dimensions the separator is a plane). The analytical representation of the separator gives a weight for each of the dimensions. The higher the weight, the more important the dimension is and implicitly the corresponding metric.

One-vs-all logistic regression ("OVA LR") is used to extract a subset of features that best describe each cluster of VMs. OVA LR is a supervised statistical machine learning technique for classification. Given a dataset of features and labeled points (i.e., feature vector) that represent positive and negative examples, OVA LR identifies the subset of features and their associated coefficients that can be used to distinguish the positive examples from the negative examples. OVA LR uses features in one cluster as the set of positive examples while considering all the points in the remaining clusters as negative examples, reducing the problem to a 2-class classification. The subset of features and coefficients that describe a cluster is the cluster's "fingerprint."

Logistic regression characterizes the structure of the statistical clusters obtained from K-means clustering described above by identifying the relevant features of each cluster. OVA LR produces a fingerprint for each group of VMs in the form of a summarized/compressed representation of raw metrics. OVA LR is a classification technique for identifying the aspects that describe a labeled set of data points. OVA LR is based on a sigmoid function classifier taken from values between 0 and 1:

$$h_\Theta(\vec{VM}_L) = \frac{1}{1+e^{-\vec{\Theta}^T \vec{VM}_L}} \quad (14)$$

where $\vec{\theta}$ is a vector of weights and has the same dimensions as the feature vector $\vec{VM}_L$. OVA LR assigns a label (y=1 or y=0) to each new data point $\vec{VM}_L$ based on a training set for which the labels are already known. The hypothesis output $h_\theta(\vec{VM}_L)$ is interpreted as the estimated probability that y=1 on $\vec{VM}_L$. The rule that assigns labels given θ parameters is intuitive:

$$\text{Label}(\vec{VM}_L) = \begin{cases} 1 & h_\Theta(\vec{VM}_L) \geq 0.5 \\ 0 & h_\Theta(\vec{VM}_L) < 0 \end{cases} \quad (15)$$

The classification rule in Equation (15) can be simplified to $$\text{Label}(\vec{VM}_L) = \begin{cases} 1 & \Theta^T \vec{VM}_L \geq 0 \\ 0 & \Theta^T \vec{VM}_L < 0 \end{cases} \quad (16)$$

The $\vec{\theta}^T \vec{VM}_L = 0$ describes the decision boundary for our hypothesis. The points on one side of the boundary receive the label y=1 while points on the other side receive y=0. The components of the vector $\vec{\theta}$ are determined by minimizing a cost function given by:

$$J(\Theta) = \frac{1}{u} \sum_{i=1}^{u} \text{Cost}(h_\Theta(\vec{VM}_{L,i}), y_i) \quad (17)$$

where $$\text{Cost}(h_\Theta(\vec{VM}_{L,i}), y_i) = \begin{cases} -\log(h_\Theta(\vec{VM}_L)) & y=1 \\ -\log(1-h_\Theta(\vec{VM}_L)) & y=0 \end{cases}$$

The output from OVA LR is the vector $\vec{\theta}$ that describes the class of positive examples and their associated weights called coefficients. Examples of vector $\vec{\theta}$ coefficients are presented in tables of the Example subsection below. The coefficients of the vector $\vec{\theta}$ are the fingerprint used to identify each of the virtual machines and can be used to compare the performance of one VM to the performance of other VMs.

The quality of the classification is analyzed by examining certain measures, such as precision, recall, and an F-measure given respectively by:

$$\text{precision} = \frac{tp}{tp+fp}$$

$$\text{recall} = \frac{tn}{tn+fn}$$

and $$F-\text{measure} = \frac{2 \cdot \text{precision} \cdot \text{recall}}{\text{precision}+\text{recall}}$$

where
  tp is the number of true positives;
  fp is the number of false positives;
  tn is the number of true negatives; and
  fn is the number false negatives.

Figure 7A:
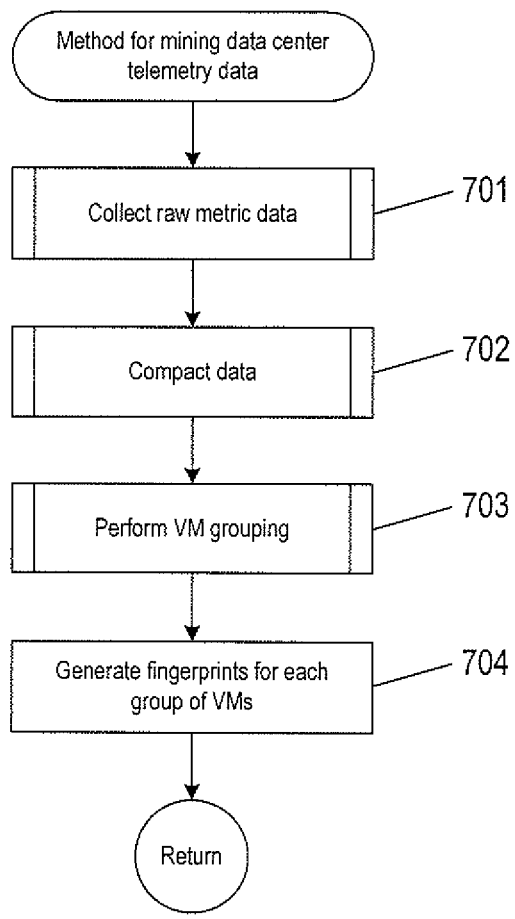
FIGS. 7A-7D shows flow diagrams of a method for mining telemetry in order to obtain VM performance related information.

FIG. 7A shows a flow diagram of a method for mining data center telemetry data in order to obtain VM performance related information. In block 701, a routine "collect raw metric data" is called to calculate a data matrix for each epoch. The routine "collect raw metric data" may be implemented as described below with referenced to FIG. 7B. In block 702, the data matrices are input to a routine "compact data" called to reduce the number of entries in the data matrices using PCA described above with reference to Equations (3)-(7). The routine "compact data" may be implemented as described below with referenced to FIG. 7B. In practice, the routine "compact data" may be omitted. In block 703, a routine "perform VM grouping" is called to group VMs. The routine "perform VM grouping" may be implemented as described below with referenced to FIG. 7C. In block 704, OVA LR is used to generate a subset of coefficients that best characterize each cluster of VMs as described above with reference to Equations (14)-(17). The subset of coefficients that describe a cluster of VMs is the cluster's "fingerprint."

Figure 7B:
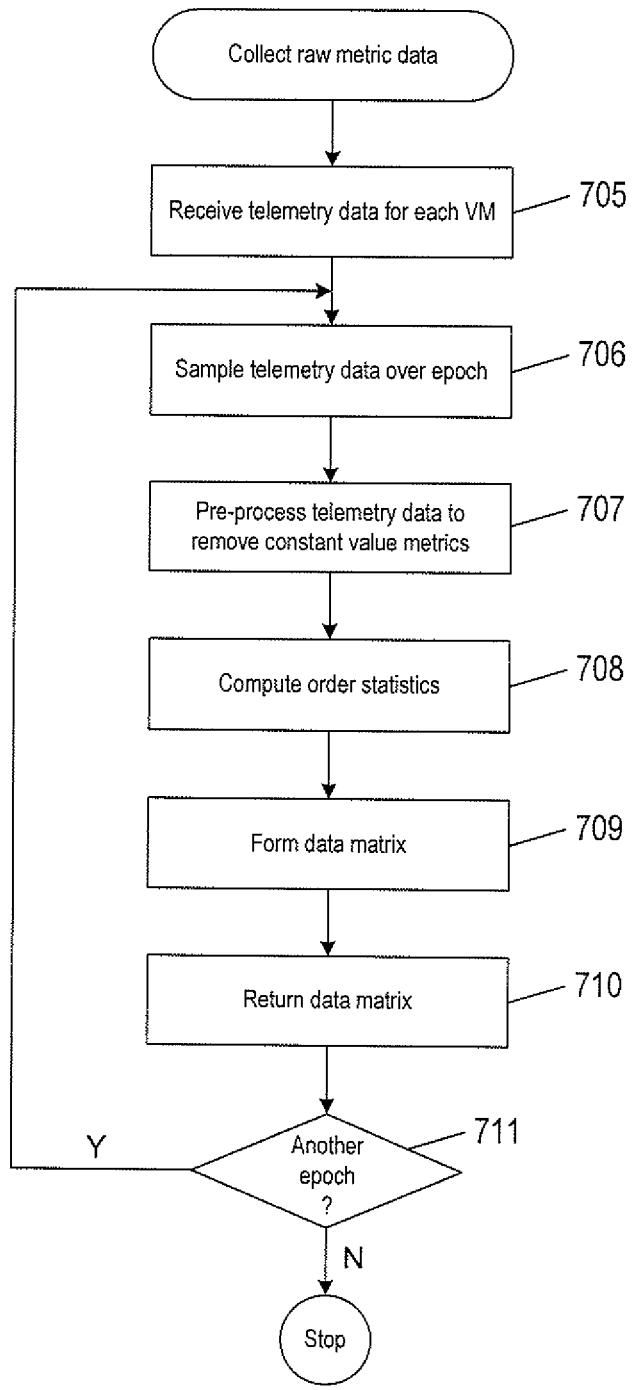

FIG. 7B shows flow-control diagram for the routine "collect raw metric data" called in block 701 of the flow diagram in FIG. 7A. In block 705, telemetry data is received for each VM from a virtual machine monitor as described above with reference to FIG. 2. In block 706, the telemetry data for each VM is sampled for every epoch as described above with reference to FIG. 2. In block 707, the sampled telemetry date is pre-processed in order to discard constant metrics data. In block 708, order statistics that characterize features of the VMs are calculated for each metric of the sampled telemetry data, as described above with reference to Equation (1). In block 709, the order statistics are organized to form data matrix, as described above with reference to FIGS. 3-4. In block 710, the data matrix is returned. In block 711, when another epoch has elapsed, the operations in blocks 706-710 are repeated.

Figure 7C:
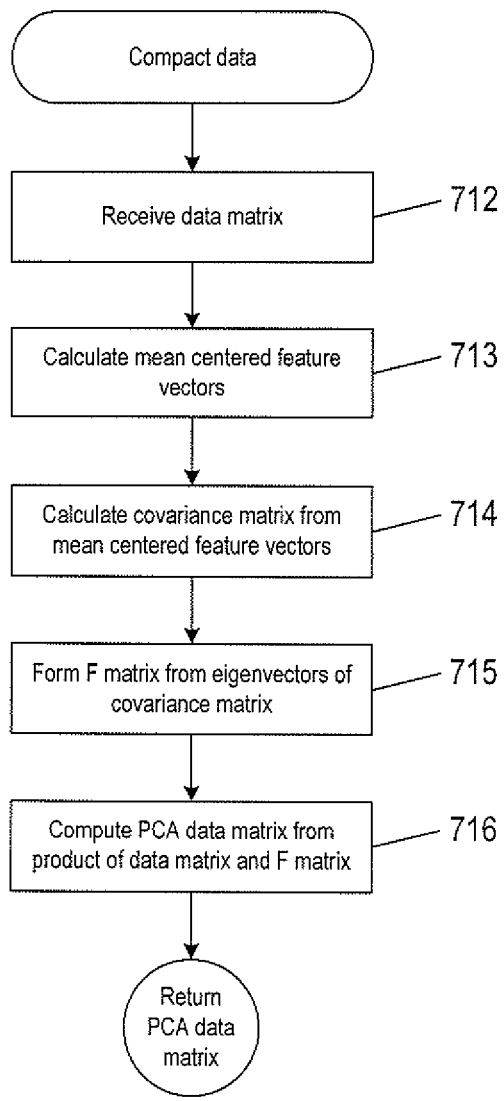

FIG. 7C shows a flow diagram for the routine "compact data" called in block 702 of the flow diagram in FIG. 7A. In block 712, the data matrix generated by the routine "collect raw metric data" is received. In block 713, means centered features vectors associated with the data matrix are calculated as described above with reference to Equation (4). In block 714, the covariance matrix is calculated for the mean centered feature vectors as described above with reference to Equation (6). In block 715, a matrix eigenvectors is formed based on a user selected reduced dimensionality of the space for the feature vectors. In block 716, the PCA data matrix is calculated according to Equation (7) described above.

Figure 7D:
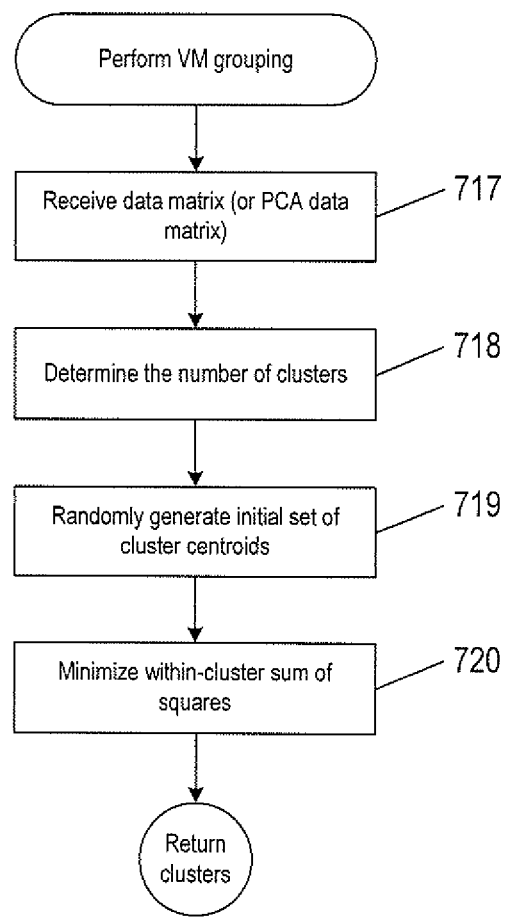

FIG. 7D shows flow diagram for the routine "perform VM grouping" called in block 703 of the flow diagram in FIG. 7A. In block 717, the PCA data matrix generated by the routine "compact data" is received. Alternatively, if the "compact data" method is omitted from the method described above with reference to FIG. 7A, the data matrix generated by the routine "collect raw metric data" is instead received. In block 718, the number of clusters may be calculated according to the elbow method described above with reference to Equation (10) and FIG. 5. Alternatively, the number of clusters may be calculated according to the BIC described above with reference to Equations (11)-(17) and FIG. 6. In block 719, a set of initial clusters is randomly generated. In block 720, the clusters are minimized according to the within-cluster sum squares described above with reference to Equations (8)-(9).

EXAMPLES

The data-mining methods described above were applied to debug performance for a tool used to emulate and evaluate large-scale deployments of virtual desktops. The tool was configured to generate workloads that are representative of user-initiated operations (e.g., interacting with documents, media and email) that take place in virtualized desktop infrastructure ("VDI"). The VDI is the practice of hosting a desktop operating system in a virtual machine running on a centralized server.

A tool deployment consists of three groups of VMs: 1) desktops that generate loads, such as launch applications and execute tasks, 2) clients that are connected to the desktops via a remote display protocol, such as PCoIP, and display the results of actions being executed on the desktop, and 3) infrastructure VMs that host the components of the tool (e.g., the controller that launches the experiments), and VMs concerned with monitoring the virtual and physical environment, such as a virtualized data center. During a tool run, the desktop VMs run a mix of applications. Applications perform a randomized mix of tasks including: open, close, save, save as, minimize, maximize, start/stop presentation, modify document, play/stop video, as appropriate for the specific application being run.

The tool experiment cluster included a total of 175 VMs: 84 desktop VMs, 84 client VMs that use PCoIP to connect to desktops, and 7 infrastructure VMs (3 vCOPS VMs and 4 tool infrastructure VMs). The tool run lasted for ~5 hours and the 184 VMs generated approximately 360 MB of metric data in a concise CSV-based storage format. The results below show that: (1) The VMs can be automatically group/clustered based on their telemetry patterns. The clustering results are robust, remaining stable over time and they are not sensitive to various choices of order statistics used on raw telemetry data to create the features used for clustering. (2) An accurate fingerprint that contains the subset of metrics that best describe the behavior of the VMs in the group can be generated. (3) The raw metric feature vectors using techniques like PCA described above can be used to compress the raw metric data and maintain accurate and stable VM groupings. (4) Techniques from signal processing can be used to filter and select fingerprint metrics useful for explaining/diagnosing differences within groups of ostensibly similar VMs. Finally, it was demonstrated that conditional probability distributions can be used to effect an explanation/diagnosis.

Figure 8:
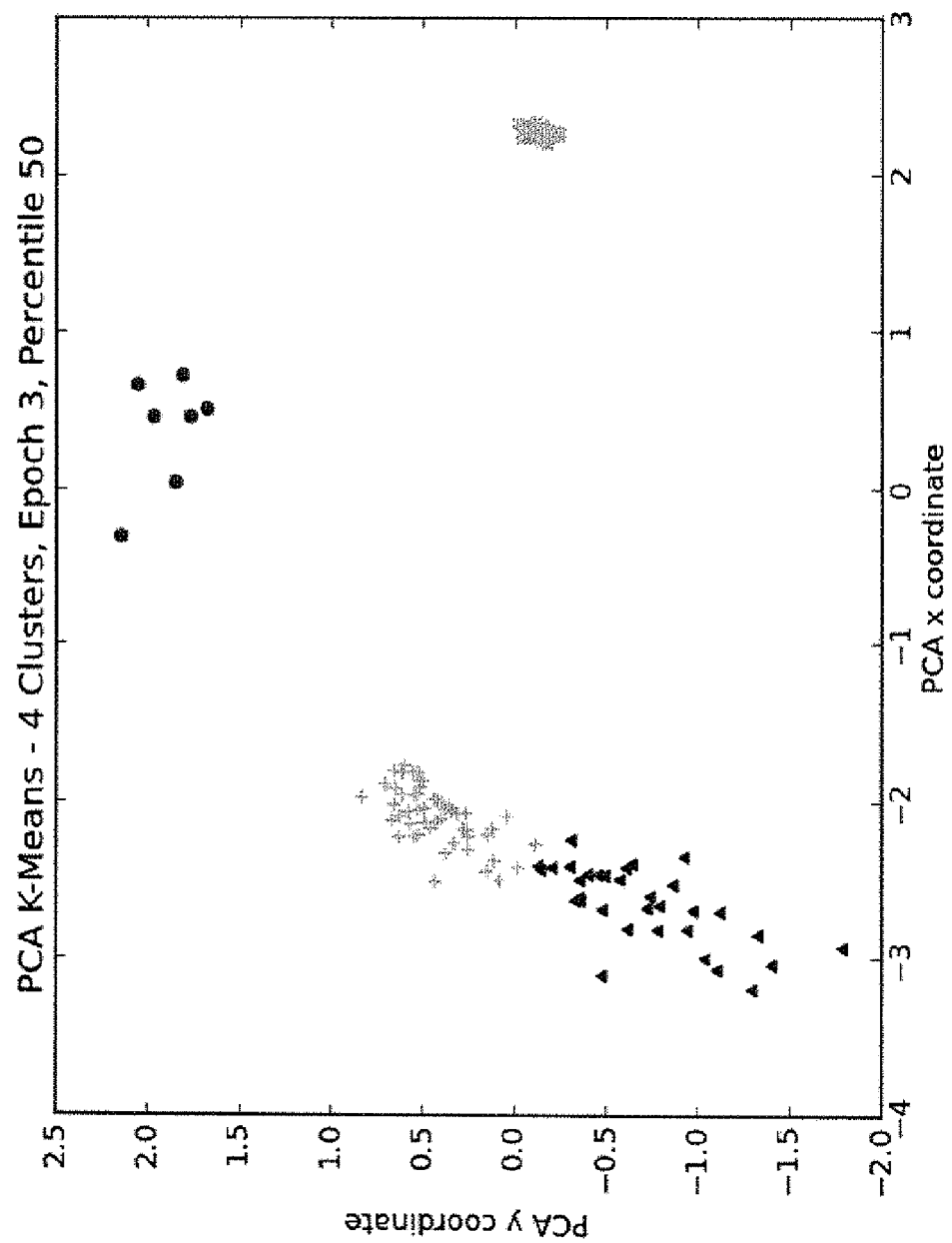
FIG. 8 shows an example of cluster results using principle component analysis ("PCA").
Figure 9:
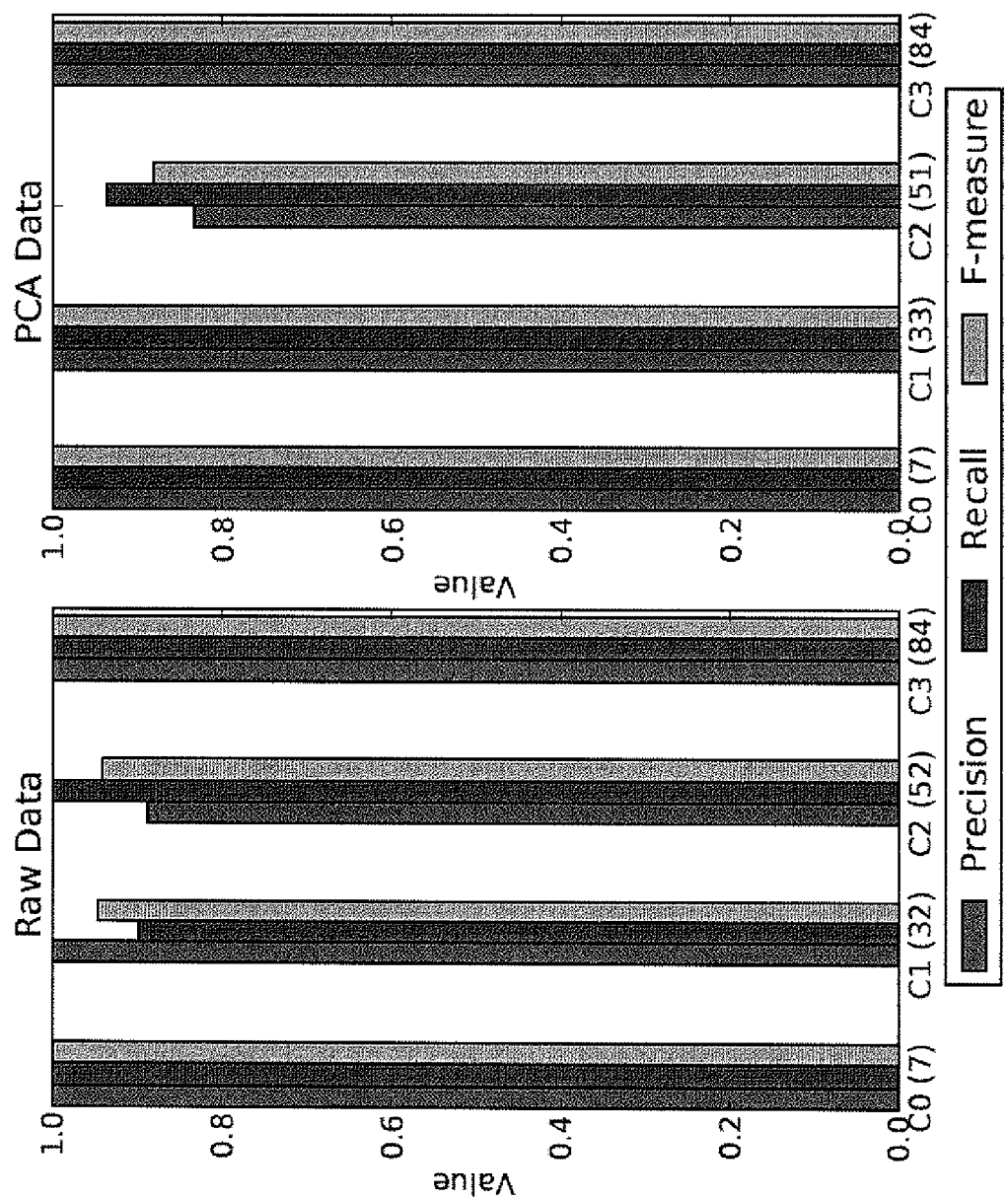
FIG. 9 shows histograms that represent accuracy of classifying clusters based on raw telemetry data or PCA summarized data.

FIG. 8 shows an example of clustering results of the PCA-summarized metric data taken during the $4^{th}$ hour (epoch 3) of observation. To determine that partitioning the data into 4 clusters is reasonable the BIC described above was used. The PCA projection of tool data is arranged in four clusters by K-means clustering. The 84 desktops were distributed by two adjacent clusters of 51 "+'s" and 22 "Δ's." Eighty-four client VMs were tightly knit x's and infrastructure VMs are o's. One key observation was that the VM clients were tightly clustered and the infrastructure VMs were off to one side in in a separate cluster. In other words, the desktops were spread across two adjacent clusters. This relative arrangement where desktops clients and infrastructure VMs maintain strict separation persisted throughout the tool run. FIG. 9 shows the accuracy of classifying each cluster and highlights the agreement between clustering based on raw telemetry data or PCA summarized data. Classification accuracy of each VM cluster was accomplished using precision, recall, and F-measure as described above.

Tables 1, 2 and 3 shows the respective metric fingerprints that best describe (and partition) the clusters of VMs. Table 1 displays the fingerprints for the cluster of 84 clients. Note the prominent contribution of CPU and network metrics.

TABLE 1

| Coefficient | Metric Name |
| --- | --- |
| 1.239 | cpu.latency.average |
| 1.204 | cpu.ready.summation |
| 0.910 | cpu.usagemhz.average |
| 0.885 | cpu.usage.average |
| 0.765 | net.multicastRx.summation |
| 0.714 | rescpu.runav1.latest |
| 0.710 | cpu.demand.average |
| 0.706 | rescpu.actpk1.latest |
| 0.704 | rescpu.actav1.latest |
| 0.626 | rescpu.actav5.latest |
| 0.613 | rescpu.actpk5.latest |
| 0.610 | rescpu.runav5.latest |
| 0.591 | cpu.system.summation |
| 0.582 | disk.maxTotalLatency.latest |
| 0.570 | datastore.numberWriteAveraged.average |

Table 2 displays the fingerprints of the clusters of 51 desktops.

TABLE 2

| Coefficient | Metric Name |
| --- | --- |
| 0.637 | net.broadcastRx.summation |
| 0.584 | mem.usage.average |
| 0.534 | virtualDisk.numberWriteAveraged.average |
| 0.528 | virtualDisk.writeIOSize.latest (ide0:0) |
| 0.502 | virtualDisk.write.average |
| 0.501 | virtualDisk.smallSeeks.latest |
| 0.500 | virtualDisk.writeLateneyUS.latest |
| 0.499 | virtualDisk.largeSeeks.latest |
| 0.480 | virtualDisk.writeIOSize.latest (scsi0:0) |
| 0.440 | net.multicastRx.summation |
| 0.400 | mem.consumed.average |
| 0.397 | mem.entitlement.average |
| 0.397 | mem.granted.average |
| 0.354 | disk.numberWriteAveraged.average |
| 0.350 | datastore.numberWriteAveraged.average |

Table 3 displays the fingerprints for the cluster of 22 desktops.

TABLE 3

| Coefficient | Metric Name |
| --- | --- |
| 1.289 | cpu.latency.average |
| 1.169 | cpu.ready.summation |
| 0.912 | cpu.usage.average |
| 0.909 | cpu.usagemhz.average |
| 0.815 | rescpu.runav1.latest |
| 0.751 | rescpu.actpk5.latest |
| 0.749 | rescpu.actpk1.latest |

TABLE 3-continued

| Coefficient | Metric Name |
|---|---|
| 0.707 | rescpu.actav1.latest |
| 0.702 | cpu.demand.average |
| 0.674 | rescpu.runav5.latest |
| 0.665 | rescpu.actav5.latest |
| 0.632 | net.broadcastRx.summation |
| 0.610 | cpu.idle.summation |
| 0.608 | cpu.wait.summation |
| 0.571 | rescpu.runav15.latest |

The original expectation was to have 3 groups of VMs instead of 4. A technique for debugging the difference is now described. Specifically why and how the two adjacent groups of desktop VMs shown in FIG. 8 are different is described. Conditional probability distributions were used to explain the difference.

Spread metrics were used to differentiate two clusters or cause a cluster to split or diffuse. Spread metrics characterize how much the expected value of the order statistic (e.g., the median) of a metric E[m] differs between two clusters (i.e., the expected value is conditioned on the cluster). Note that the expected value summarizes the behavior of the distribution of the order statistics of a metric, which by definition it is the weighted average of all the possible values a random variable can take. The expectation over the distribution of an order statistic captures the aggregate behavior over a population of VMs. In this case, the population of VMs is the neighborhood of similar VMs determined by K-means clustering. Concisely, a spread metric is given by $$\frac{abs(E[m \mid clusterA] - E[m \mid clusterB])}{m_{max}} > \theta$$

where

E[m|cluster i] is the expected value of a metric m conditioned on the VM being in cluster i;

$m_{max}$ is the maximum value of that metric over the clusters considered and serves as a normalization factor; and θ is a tuning parameter that is used to identify metrics to filter/remove based on the magnitude of the differences in expected values.

Using too small of a value for θ filters or removes a larger number of metrics, potentially to the point of removing metrics that distinguish previously disparate (non-adjacent) clusters of VMs. Experiments revealed that values for θ between 0.1 and 0.2 work well. In this example, θ=0.1 was used.

Given that there are possibly hundreds of metrics that can be consider as candidates for spread metrics and considering the computational expense of constructing conditional probability distributions, the Silverman's test was used to identify multi-modal metrics and process these first when looking for candidate metrics to construct the conditional probability distributions over. Entropy-based measures, e.g., mutual information, were also used to determine what metrics to condition metric in on.

Table 4 shows the top ten spread metrics that separate the two clusters of desktops in FIG. 2. The top 10 spread metrics separating cluster (A) of 51 desktops form the remaining (B) 33 desktops.

TABLE 4

| \|E[m\|A] − E[m\|B]\|/m__max | Metric Name | E[m\|A]/m__max | E[m\|B]/m__max |
|---|---|---|---|
| 0.453 | cpu.ready.summation | 0.291 | 0.744 |
| 0.443 | cpu.latency.average | 0.247 | 0.690 |
| 0.386 | rescpu.actpk1.latest | 0.324 | 0.711 |
| 0.375 | rescpu.runav1.latest | 0.335 | 0.710 |
| 0.372 | cpu.usagemhz.average | 0.312 | 0.684 |
| 0.372 | cpu.usage.average | 0.312 | 0.684 |
| 0.366 | rescpu.actpk5.latest | 0.409 | 0.775 |
| 0.360 | rescpu.actav1.latest | 0.196 | 0.556 |
| 0.356 | cpu.demand.average | 0.201 | 0.558 |
| 0.311 | rescpu.actav5.latest | 0.257 | 0.568 |

Figure 10:
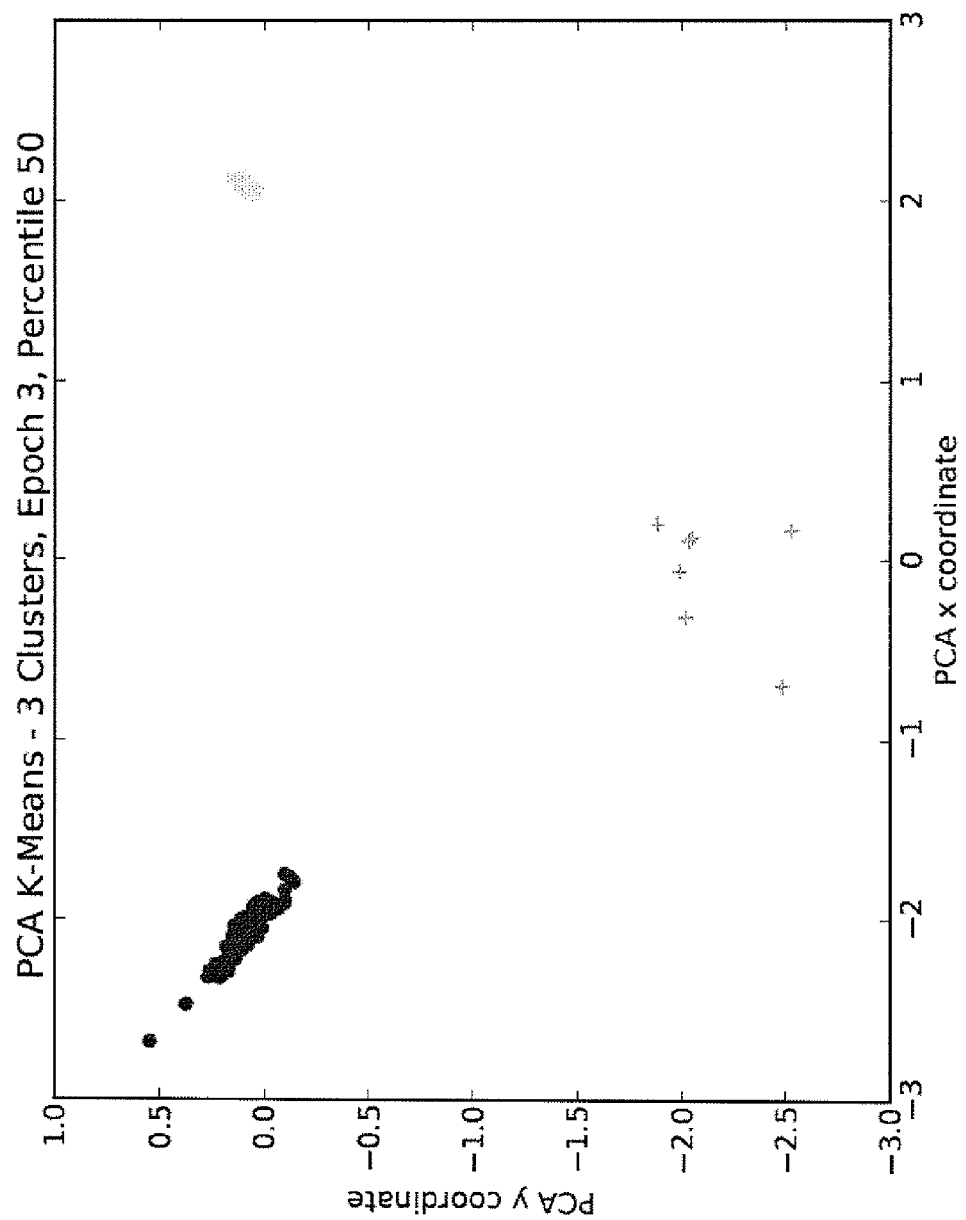
FIG. 10 shows an example of re-clustered telemetry data after removing spread metrics.

FIG. 10 shows that reclustering the telemetry data after removing the spread metrics causes the desktop cluster to tighten. Using the BIC measure to evaluate different values for the number of clusters in K-means gives 3 clusters instead of 4. In essence the spread metrics are the fingerprint for explaining the differences in the behavior of desktops.

Figure 11:
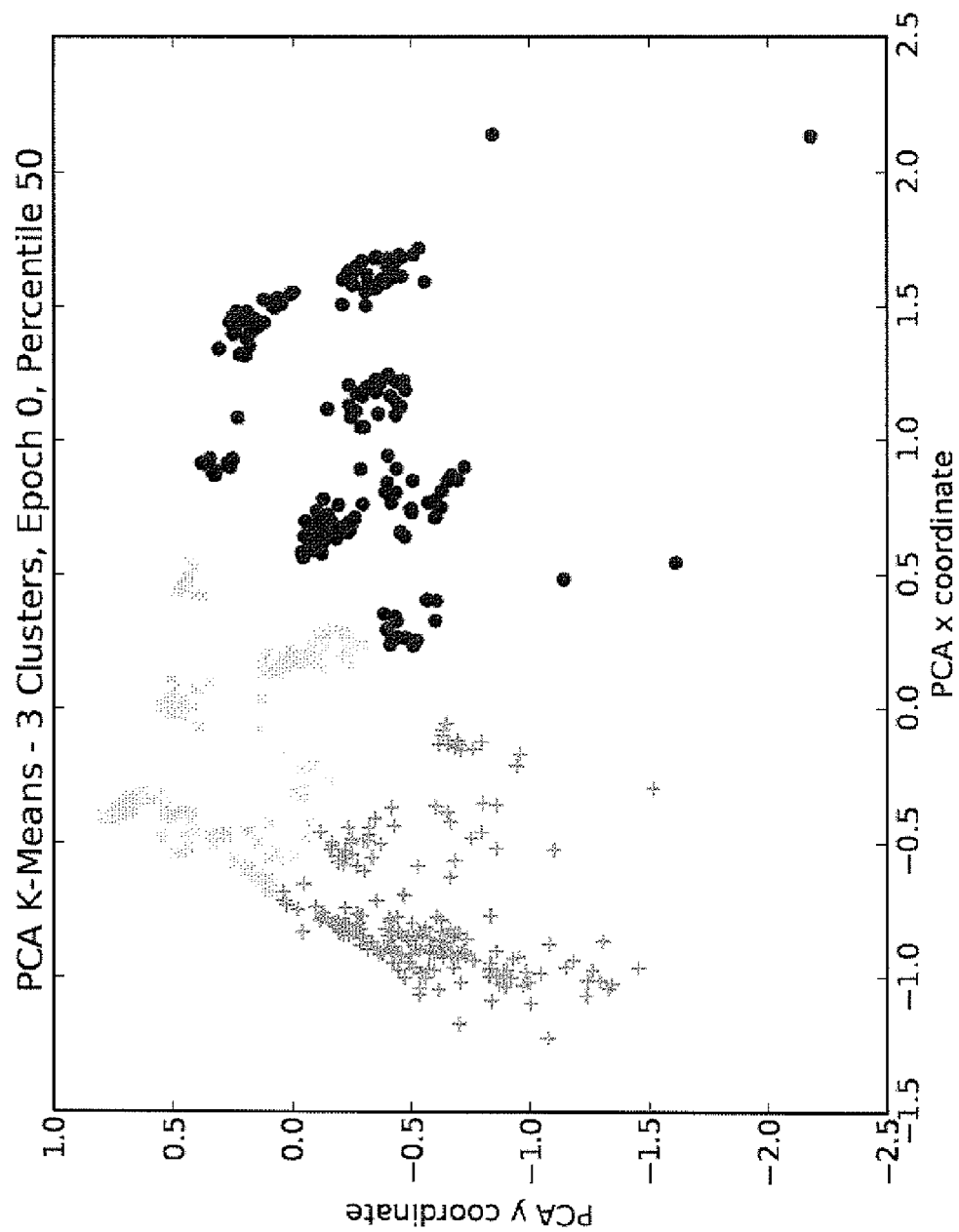
FIG. 11 shows an example of cluster results obtained for 768 VMs.

Next, the data-mining methods were applied to a cluster of computers for 5 days, generating 19 GB of data stored in concise CSV format and 1.2 GB of indexes used for querying. FIG. 11 shows the clustering results obtained for 768 VMs on one of the clusters from an epoch (1 hr) of data. The VMs were coarsely clustered in to 3 groups according to BIC. The 3 clusters are delineated in FIG. 11 as follows: 199 VMs (x's) with *-vc-vpxinstall, *-vc-vcvainstall, *-generic-ovf, *-vcd-vcdinstall, *-vc-cloudvminstall, *-vc-vpxinstall, *-vsm-vsminstall suffixes; 207 VMs (o's) with *-esx-fullinstall and *-esx-pxeboot suffixes; and with 362 VMs (+'s) with *-nfs-default, *-iscsi-default, *-esx-fullinstall and *-esx-pxeboot suffixes.

The spread metrics were computed within the cluster of 207 VMs to identify the metrics that explain the dispersion. Thirty metrics were identified where the spread is greater than θ=0.1 and shown in the top 10 metrics in Table 5.

TABLE 5

| \|E[m\|A] − E[m\|B]\|/m__max | Metric Name | E[m\|A]/m__max | E[m\|B]/m__max |
|---|---|---|---|
| 0.420 | mem.usage.average | 0.371 | 0.791 |
| 0.356 | net.multicastRx.summation | 0.773 | 0.417 |
| 0.355 | net.broadcastRx.summation | 0.774 | 0.419 |
| 0.355 | net.packetsRx.summation | 0.774 | 0.419 |
| 0.354 | net.received.average | 0.771 | 0.417 |
| 0.354 | net.bytesRx.average | 0.771 | 0.417 |
| 0.352 | net.throughput.usage.average | 0.772 | 0.420 |
| 0.351 | net.usage.average | 0.768 | 0.417 |
| 0.273 | cpu.idle.summation | 0.397 | 0.124 |
| 0.273 | cpu.wait.summation | 0.397 | 0.124 |

Figure 12:
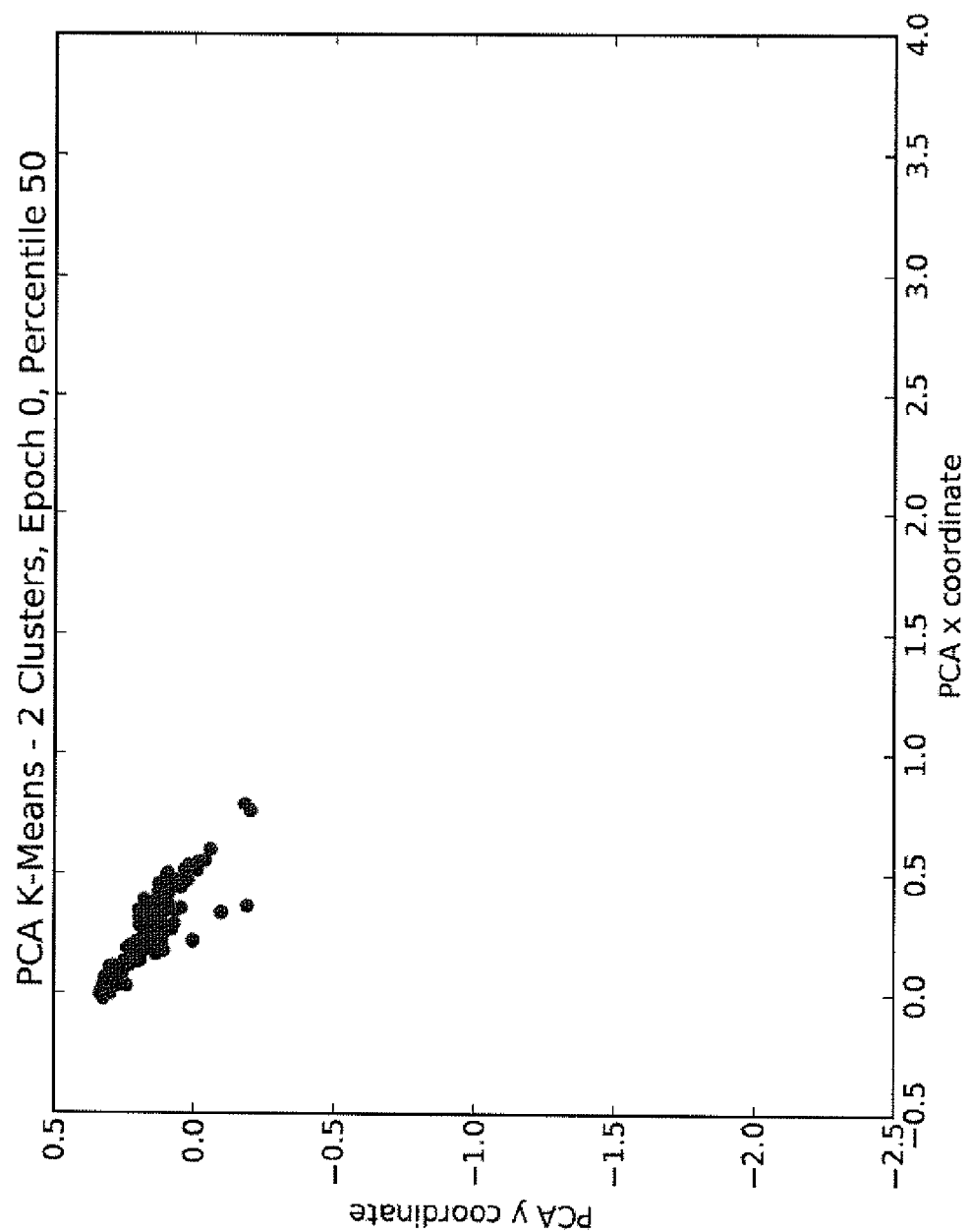
FIG. 12 shows an example of a cluster of 207 VMs after spread metrics have been removed.

FIG. 12 shows the cluster of 207 VMs collapses once the spread metrics are removed.

Embodiments described above are not intended to be limited to the descriptions above. For example, any number of different computational-processing-method implementations that carry out for mining telemetry data may be designed and developed using various different programming languages and computer platforms and by varying different implementation parameters, including control structures, variables, data structures, modular organization, and other such parameters.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A data-processing system comprising:
   one or more processors;
   one or more computer-readable media; and
   a routine stored in the computer-readable media that when executed on the one or more processors,
      collects streams of raw telemetry data, each stream composed of metric data associated with a virtual machine of a set of virtual machines;
      generates data matrices from the streams of telemetry data, each data matrix generated from the raw telemetry data collected in an epoch of time and composed of rows of feature vectors with each feature vector having order statistics that represent one or more features of one of the virtual machines;
      identify clusters of virtual machines having corresponding order statistics into clusters based on the data matrices; and
      generates a fingerprint for each virtual machine in each cluster based on the feature vector associated with each virtual machine, the fingerprint identifies performance characteristics of each virtual machine.

2. The system of claim 1, wherein generates the data matrices from the streams of raw telemetry data further comprises:
   receives the raw telemetry data for each virtual machine from a virtual machine monitor;
   for each epoch of time,
      collects samples the raw telemetry data within each epoch;
      removes constant valued metrics for each virtual machine;
      computes an order statistic for each metric in the raw telemetry data; and
      forms a data matrix composed of the order statistics for each virtual machine.

3. The system of claim 2, wherein the order statistic is one of a percentile, minimum, maximum, sample average, and sample median over the epoch.

4. The system of claim 2, wherein each row of the data matrix is composed of order statistics associated with one of the virtual machines.

5. The system of claim 2, further comprise compacts the data matrix to a lower dimensional data matrix.

6. The system of claim 5, wherein compacts each data matrix to a lower dimensional data matrix further comprises:
   computes a mean for each of the order statistics in the data matrix;
   computes a mean centered vector for each row of the data matrix based on the mean of the order statistics;
   computes a covariance matrix from the means centered vector;
   computes eigenvalues and eigenvectors from the covariance matrix; and
   computes the lower dimensional data matrix from a product of the data matrix with a subset of eigenvectors that correspond to a user selected number of largest eigenvalues.

7. The system of claim 1, wherein identifies clusters of virtual machines further comprises applies K-means clustering to each data matrix in order to identify clusters of similar virtual machines.

8. The system of claim 1, wherein generates the fingerprint for each virtual machine further comprises applies one-versus-all logistic regression to each feature vector in a data matrix to generate a vector of coefficients based on a sigmoid classifier function, each vector of coefficients is a fingerprint of one of the virtual machines and identifies performance characteristics of the virtual machine.

9. A method carried out within a computer system having one or more processors and an electronic memory that mines datacenter telemetry data stored in one or more computer-readable media, the method comprising:
   collecting streams of raw telemetry data, each stream composed of metric data associated with a virtual machine of a set of virtual machines;
   generating data matrices from the streams of raw telemetry data, each data matrix generated from the raw telemetry data collected in an epoch of time and composed of rows of feature vectors with each feature vector having order statistics that represent features of one of the virtual machines;
   identifying clusters of virtual machines having corresponding metric data based on the feature vectors of the data matrices; and
   generating a fingerprint for each virtual machine in each cluster based on the feature vector associated with each virtual machine, the fingerprint identifies performance characteristics of each virtual machine.

10. The system of claim 9, wherein generating the data matrices from the streams of raw telemetry data further comprises:
    receiving the raw telemetry data for each virtual machine from a virtual machine monitor;
    for each epoch of time,
       collecting samples the raw telemetry data within each epoch;
       removing constant valued metrics for each virtual machine;
       computing an order statistic for each metric in the raw telemetry data; and
       forming a data matrix composed of the order statistics for each virtual machine.

11. The method of claim 10, wherein the order statistic is one of a percentile, minimum, maximum, sample average, and sample median over the epoch.

12. The method of claim 10, wherein each row of the data matrix is composed of order statistics associated with one of the virtual machines.

13. The method of claim 10, further comprise compacting the data matrix to a lower dimensional data matrix.

14. The method of claim 13, wherein compacting each data matrix to a lower dimensional data matrix further comprises:
    computing a mean for each of the order statistics in the data matrix;
    computing a mean centered vector for each row of the data matrix based on the mean of the order statistics;
    computing a covariance matrix from the means centered vector;
    computing eigenvalues and eigenvectors from the covariance matrix; and
    computing the lower dimensional data matrix from a product of the data matrix with a subset of eigenvectors that correspond to a user selected number of largest eigenvalues.

15. The method of claim 9, wherein identifying clusters of virtual machines further comprises applying K-means clustering to each data matrix in order to identify clusters of similar virtual machines.

16. The method of claim 9, wherein generating the fingerprint for each virtual machine further comprises applying one-versus-all logistic regression to each feature vector in a data matrix to generate a vector of coefficients based on a sigmoid classifier function, each vector of coefficients is a fingerprint of one of the virtual machines and identifies performance characteristics of the virtual machine.

17. A non-transitory computer-readable medium encoded with machine-readable instructions that implement a method carried out by one or more processors of a computer system to perform the operations of
collecting streams of raw telemetry data, each stream composed of metric data associated with a virtual machine of a set of virtual machines;
generating data matrices from the streams of raw telemetry data, each data matrix generated from the raw telemetry data collected in an epoch of time and composed of rows of feature vectors with each feature vector having order statistics that represent features of one of the virtual machines;
identifying clusters of virtual machines having corresponding metric data based on the feature vectors of the data matrices; and
generating a fingerprint for each virtual machine in each cluster based on the feature vector associated with each virtual machine, the fingerprint identifies performance characteristics of each virtual machine.

18. The medium of claim 17, wherein generating the data matrices from the streams of raw telemetry data further comprises:
receiving the raw telemetry data for each virtual machine from a virtual machine monitor;
for each epoch of time,
collecting samples the raw telemetry data within each epoch;
removing constant valued metrics for each virtual machine;
computing an order statistic for each metric in the raw telemetry data; and
forming a data matrix composed of the order statistics for each virtual machine.

19. The medium of claim 18, wherein the order statistic is one of a percentile, minimum, maximum, sample average, and sample median over the epoch.

20. The medium of claim 18, wherein each row of the data matrix is composed of order statistics associated with one of the virtual machines.

21. The medium of claim 18, further comprise compacting the data matrix to a lower dimensional data matrix.

22. The medium of claim 21, wherein compacting each data matrix to a lower dimensional data matrix further comprises:
computing a mean for each of the order statistics in the data matrix;
computing a mean centered vector for each row of the data matrix based on the mean of the order statistics;
computing a covariance matrix from the means centered vector;
computing eigenvalues and eigenvectors from the covariance matrix; and
computing the lower dimensional data matrix from a product of the data matrix with a subset of eigenvectors that correspond to a user selected number of largest eigenvalues.

23. The medium of claim 17, wherein identifying clusters of virtual machines further comprises applying K-means clustering to each data matrix in order to identify clusters of similar virtual machines.

24. The medium of claim 17, wherein generating the fingerprint for each virtual machine further comprises applying one-versus-all logistic regression to each feature vector in a data matrix to generate a vector of coefficients based on a sigmoid classifier function, each vector of coefficients is a fingerprint of one of the virtual machines and identifies performance characteristics of the virtual machine.

* * * * *